United States Patent [19]
Ishimaru

[11] Patent Number: 4,932,192
[45] Date of Patent: Jun. 12, 1990

[54] OPERATION DEVICE OF WALKER OPERATED MOWER

[75] Inventor: Takeshi Ishimaru, Ehime, Japan

[73] Assignee: Iseki & Co., Ltd., Ehime, Japan

[21] Appl. No.: 367,942

[22] Filed: Jun. 19, 1989

[30] Foreign Application Priority Data

Jul. 29, 1988 [JP] Japan .................................. 63-191834

[51] Int. Cl.$^5$ ............................................. A10D 75/00
[52] U.S. Cl. ....................................... 56/11.8; 56/10.8; 56/16.9
[58] Field of Search ...................... 56/10.8, 11.7, 11.8, 56/16.9, DIG. 6, DIG. 8

[56] References Cited

U.S. PATENT DOCUMENTS

| 4,281,732 | 8/1981 | Hoch ................................ 56/11.8 X |
| 4,433,530 | 2/1984 | Schaefer ..................... 56/DIG. 18 X |
| 4,466,232 | 8/1984 | Beugelsdyk et al. ............. 56/11.8 X |
| 4,538,401 | 9/1985 | Takamizawa et al. .......... 56/10.8 X |
| 4,573,307 | 3/1986 | Wick ..................................... 56/11.8 |
| 4,667,459 | 3/1987 | Scanland et al. ................. 56/10.8 X |
| 4,747,256 | 5/1988 | Sadakane ......................... 56/10.8 X |
| 4,753,062 | 6/1988 | Roelle ............................... 56/10.8 X |

Primary Examiner—George A. Suchfield
Attorney, Agent, or Firm—Arthur T. Fattibene

[57] ABSTRACT

An operation device of a walker operated mower is disclosed. When a mowing lever is set to the "connection" side to start a mowing member and a little bit later, when a running operation lever is set to the "connection" side substantially simultaneously while keeping the lever position, a support member which is integral with the running operation lever pushes the back of an engagement member and a rocking tip of the engagement member strikes a projection provided to the mowing operation lever and prevents the return of the mowing operation lever while keeping contact with the projection. Accordingly, even if the mowing operation member is kept in the "connection" position, the moving operation lever retain the "connection" state. Therefore, the running operation lever can be kept in the "connection" position by one of the hands and the other portions can be operated freely by the other hand.

5 Claims, 6 Drawing Sheets

OPERATION DEVICE OF WALKER OPERATED MOWER

BACKGROUND OF THE INVENTION

This invention relates to an operation device of a walker operated mower, and more particularly to an operation device of a walker operated mower of a type wherein running driving wheels and a mowing member are fitted to a machine body and their operation levers are disposed on a handle.

In an operation device of a walker operated mower having a running operation lever for connecting and disconnecting the driving force to the running driving wheels and a mowing operation lever for connecting and disconnecting the driving force to a mowing member, these operation levers can generally permit connection and disconnection to be performed individually and in an arbitrary sequence, and a return spring is disposed in each operation lever system so that when an operator releases his hand from an operation lever, the operation lever moves automatically in the disconnecting direction for the purpose of safety.

In the walker operated mower of the kind described above, both the levers must be pressed and kept in a "connection state" when each operation lever is operated to the "connection" side. Accordingly, if the operator uses both of his hands, he cannot operate the other portions and if he grips both the levers by one of this hands, the pressure of two return springs acts on the hand and this hand gets extremely fatigued.

Furthermore, the operation sequence of the operation levers is arbitrary. Therefore, if the running operation lever is first brought into the "connection" state and then the mowing operation lever is set to "connection" during the running of the driving wheels, the mowing member is driven abruptly so that an engine is likely to stop due to the abrupt increase of load at the place where grass is dense or to dig up sand and gravels in a wild land.

SUMMARY OF THE INVENTION

To eliminate the problems with the prior art device described above, the operation device of a walker operated mower in accordance with the present invention employs the following technical means. In the present invention, support frames 2, 2 are disposed at the right and left rear end portions of a loop-like handle pipe 1 so as to project downward and a running operation lever 4 for "connecting" and "disconnecting" the driving force to driving wheels 3, 3 is a disposed between the support frames 2, 2 in such a manner as to be capable of rotating freely back and forth around it shaft ends 5. A mowing operation member 7 for "disconnecting" (stopping) and "connecting" (starting) a mowing member 6 is juxtaposed with one of the support frames 2 on the side of this running operation lever 4 in such a manner as to be capable of rotating or rocking back and forth. These running operation lever 4 and mowing operation lever 7 are connected in the interlocking arrangement with each other so that when they are turned down towards the grip 29 of the handle 1, clutches 26 and 28 are connected and when these levers 4, 7 are released, the clutches are cut off. A projection 8 projecting sideways is disposed at the base portion of the mowing operation lever 7 and an engagement member 10 made of a resilient material such as a leaf spring is fitted to a rise wall 9 of the support frame 2 near the shaft 5. A support member 11 which is integral with the running operation lever 4 is disposed in such a manner as to cam or push or not to push the back of the engagement member 10 when the lever 4 swings. This support member 11 pushes or cams the back of the engagement member 10 when the running lever 4 is operated to the "connection" side a little bit after, or substantially simultaneously with, the operation of the mowing operation lever 7 to the "connection" (start) side. The engagement member 10 in this pushed state anchors in turn the projection 8 of the mowing operation lever 7. Next, when the running operation lever 4 is disconnected from this anchor state or when only the mowing operation lever 7 is operated to the "connection" (start) side, the support member 11 disengages from the back of the engagement member 10 and the gap develops between the engagement member 10 and the projection 8 of the mowing operation lever 7 so that the mowing operation lever 7 can freely swing.

Having the construction described above, the present invention provides the following technical effects. When the mowing lever 7 is set to the "connection" side to start the mowing member 6 and a little bit later, the running operation lever 4 is set to the "connection" side substantially simultaneously while keeping the lever 7 in that position, the support member 11 which is integral with the running operation lever 4 pushes the back of the engagement member 10 and the rocking tip of the engagement member 10 strikes the projection 8 of the mowing operation lever 7 and prevents the return of the mowing operation lever 7 while in contact with the projection 8. Accordingly, even if the mowing operation lever 7 is released from the hand while the running operation lever 4 is kept in the "connection" state, the mowing operation lever 7 retains the "connection" state.

Therefore, the running operation lever 4 can be kept in the "connection" position by one of the hands and the other portions can be operated by the other hand.

DESCRIPTION OF THE PREFERRED EMBODIMENTS

Figure 1:
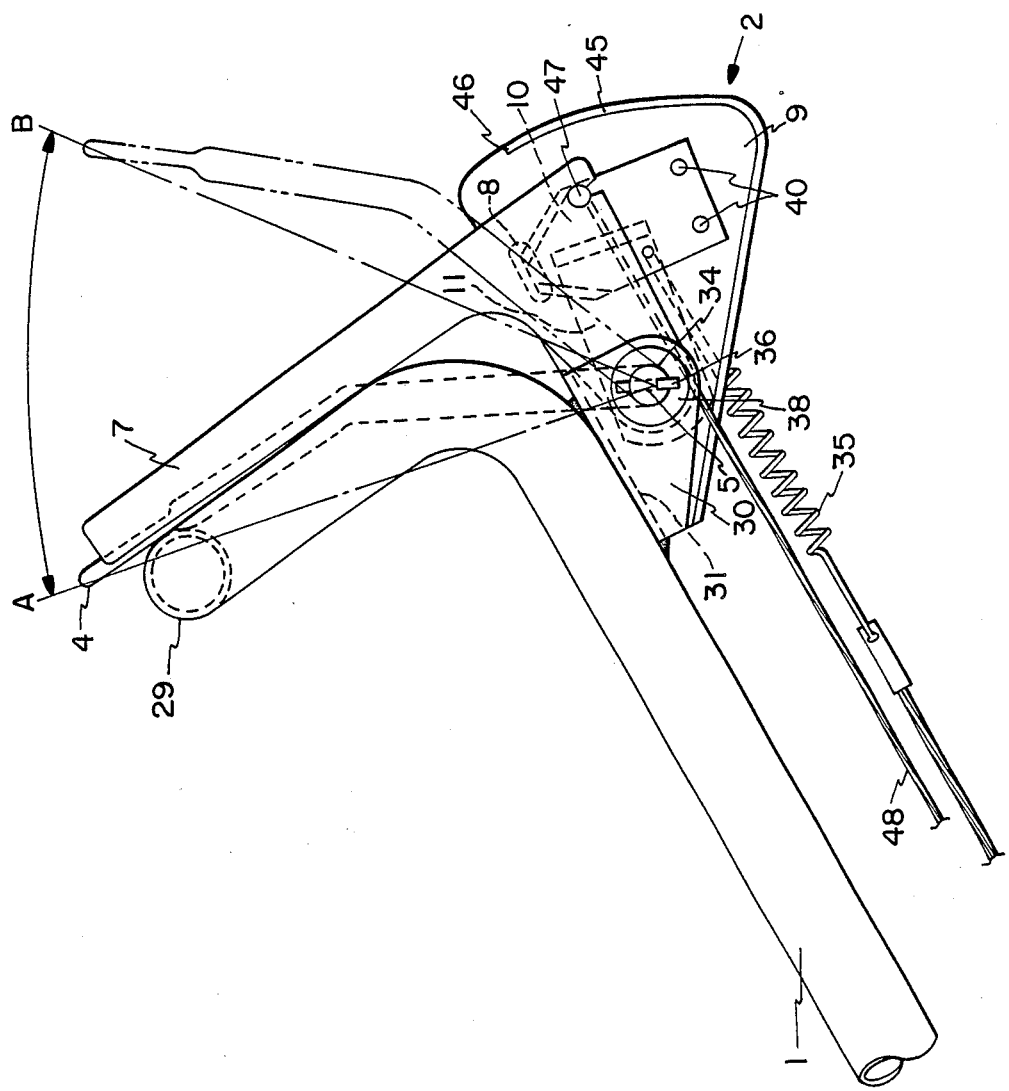
FIG. 1 is a side view of the principal portions of a walker operated mower.

Hereinafter, a typical embodiment of the present invention will be described in detail with reference to the accompanying drawings. It is to be noted, however, that the dimension, materials, shapes and relative arrangement of constituent components described in this embodiment are merely illustrative but not limitative, in particular, unless otherwise specified particularly.

The embodiment shown in the drawings represents the application of the present invention to a manual operation lever of a walker operated mower 18.

The walker operated mower 18 includes a mowing member 6 consisting of a single or a plurality of rotary blades disposed at the lower center of the mower 18 and the front and rear outer periphery, right and, left sides and upper part of this mowing member 6 are covered with covers 19, 20. An engine 21 is mounted onto the upper cover 20.

The engine 21 and the mowing member 6 are connected to each other by a driving shaft 27 and a clutch 28 for connecting and disconnecting the driving force of the engine 21 is disposed at an intermediate part of this driving shaft 27.

Reference numeral 22, 22 represents wheels that are disposed at front part of both sides of the body of the walker operated mower 18.

Reference numeral 3, 3 represents driving wheels that are fitted to both ends of an axles (not shown in the drawing) which is pivotally supported in a horizontal and transverse direction from a transmission case disposed at the rear part of the machine body of the mower 18. The power for rotation from the engine 21 is transmitted to the wheels 3, 3 through a universal joint 24 to drive them.

Reference numeral 26 represents a running clutch disposed inside the transmission case 25.

Right and left handles 1, 1 extend from the upper rear part of the covers 19, 20 of the body of the mower 18 towards the upper rear part.

The right and left rear parts of the handle 1, 1 are integrally connected in a loop by a grip 29 extending and curving upward and wall-like support frames 2, 2 projecting downward are fitted to substantially the rear end parts of the right and left handle 1, 1. In the embodiment shown in the drawing, the support frame 2 on the right side is a single sheet of support consisting of a flat sheet-like rise wall portion, while the support frame 2 on the left side is a substantially U-shaped support which consists of the inner rise wall portion 9, the outer rise wall portion 30 and a ceiling plate 31 and opens downward as viewed from the rear.

These flat sheet-like rise wall portion 2, inner rise wall portion 9 and outer rise wall portion 30 each include a support hole 32, 33, 34 and the shafts 5, 5 of the running operation lever 4 are fitted into these support holes 32, 33, 34 in such a manner that the shafts 5, 5 of a running operation lever can freely move back and forth but their movement in the transverse direction is restricted.

The running operation lever 4 rocks or rotates back and forth between an A position and a B position shown in the left-hand side view of FIG. 1. The A position coming into contact with the grip 29 is the position of state where the running clutch 26 is connected and in this "connection state position", the operator can grip concurrently both the grip 29 and the running operation lever 4 by one hand.

When the operator releases the grip, the tensile force of a return spring 35 disposed in the path of a connecting member (not shown) for connecting the clutch 26 and the running operation lever 4 in the interlocking arrangement returns automatically the running operation lever 4 to the B position which is the clutch 26 "cut state or disconnect position".

Figure 2:
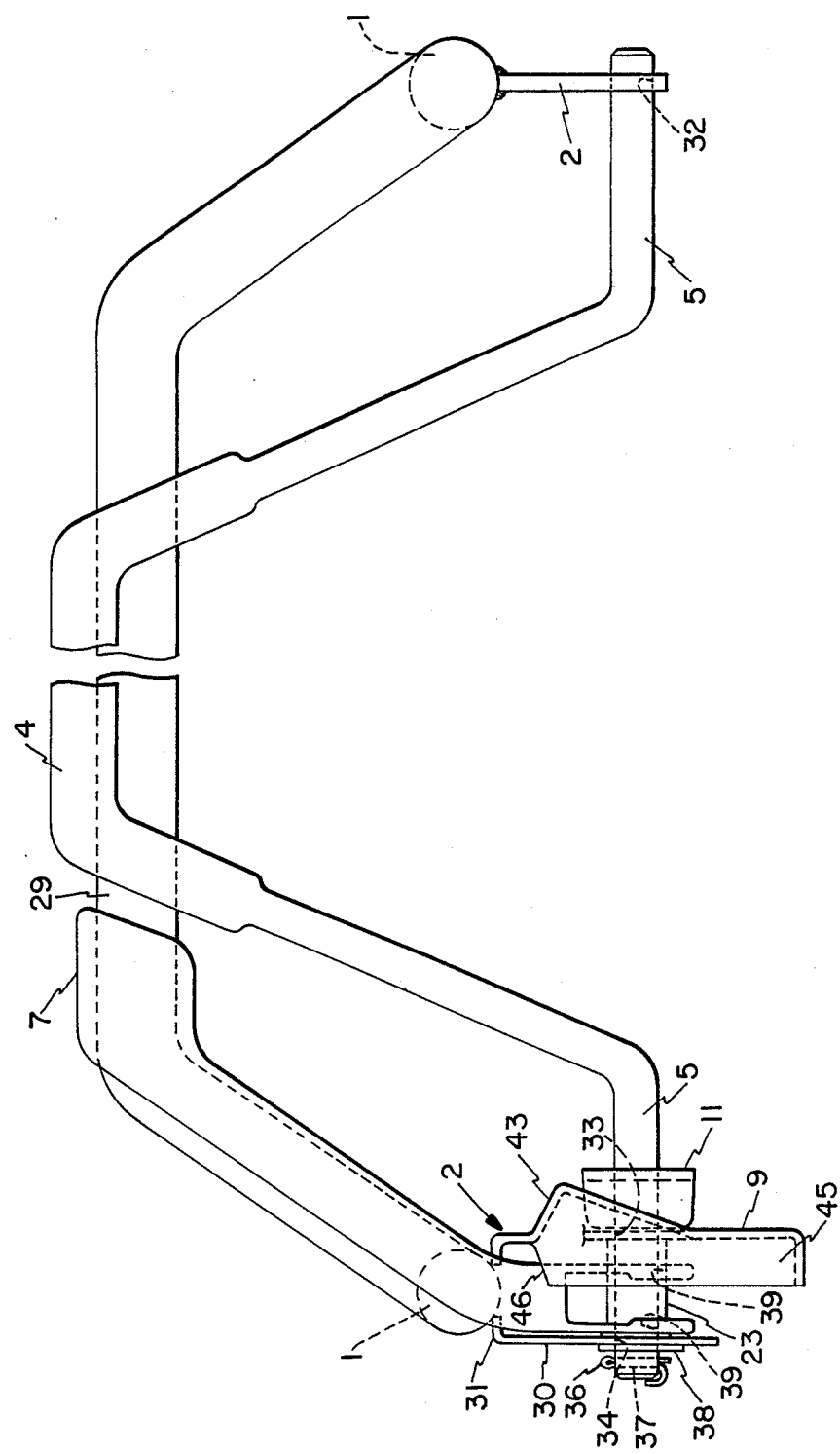
FIG. 2 is a rear view of the principal portions.
Figure 3:
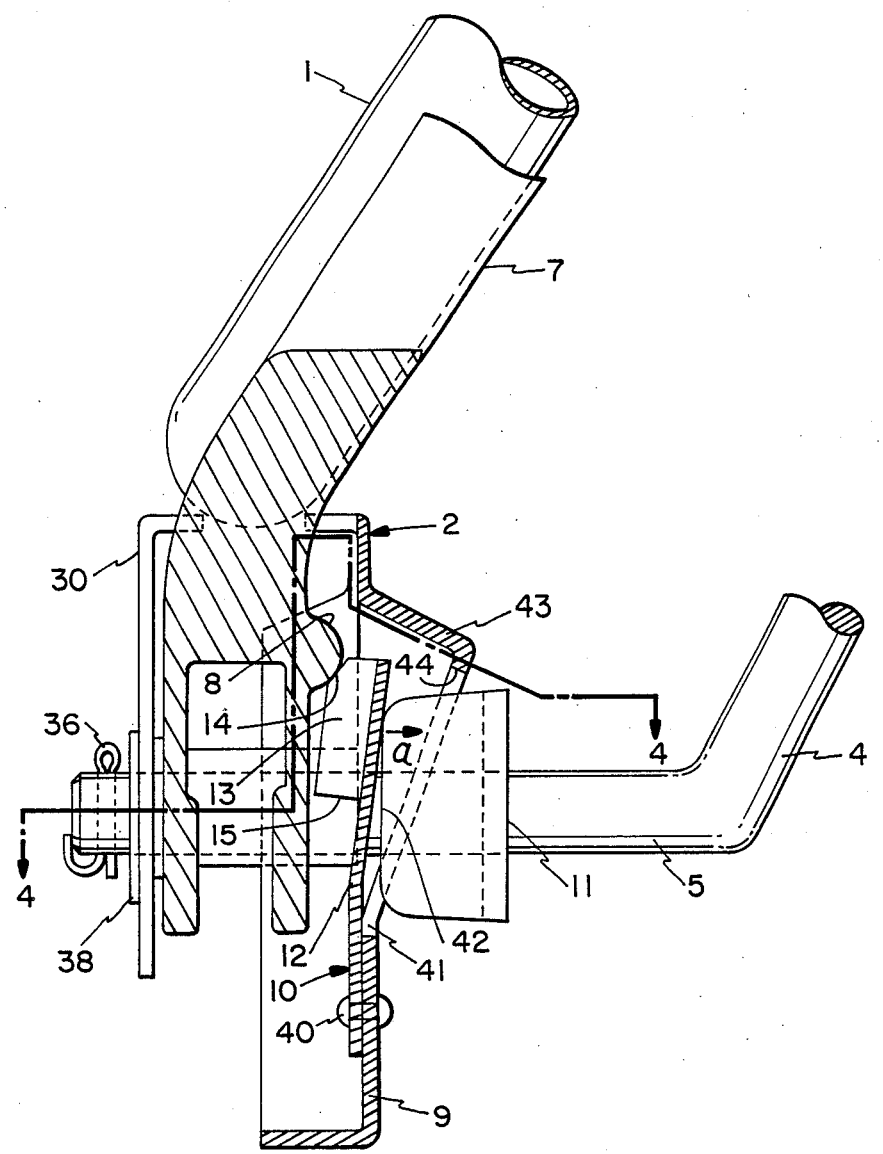
FIG. 3 is a partially sectional rear view of the principal portions.
Figure 4:
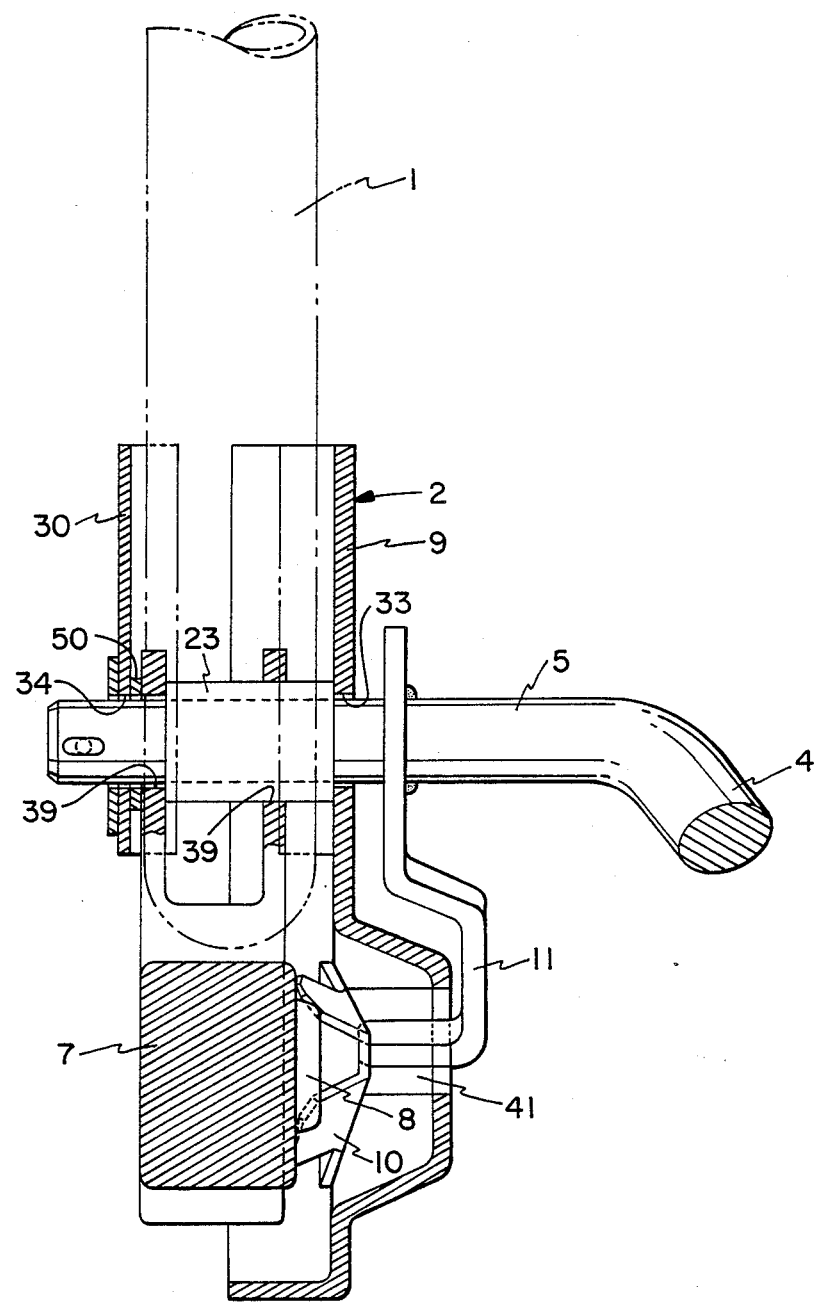
FIG. 4 is a partially sectional plan view of the principal portions.
Figure 5:
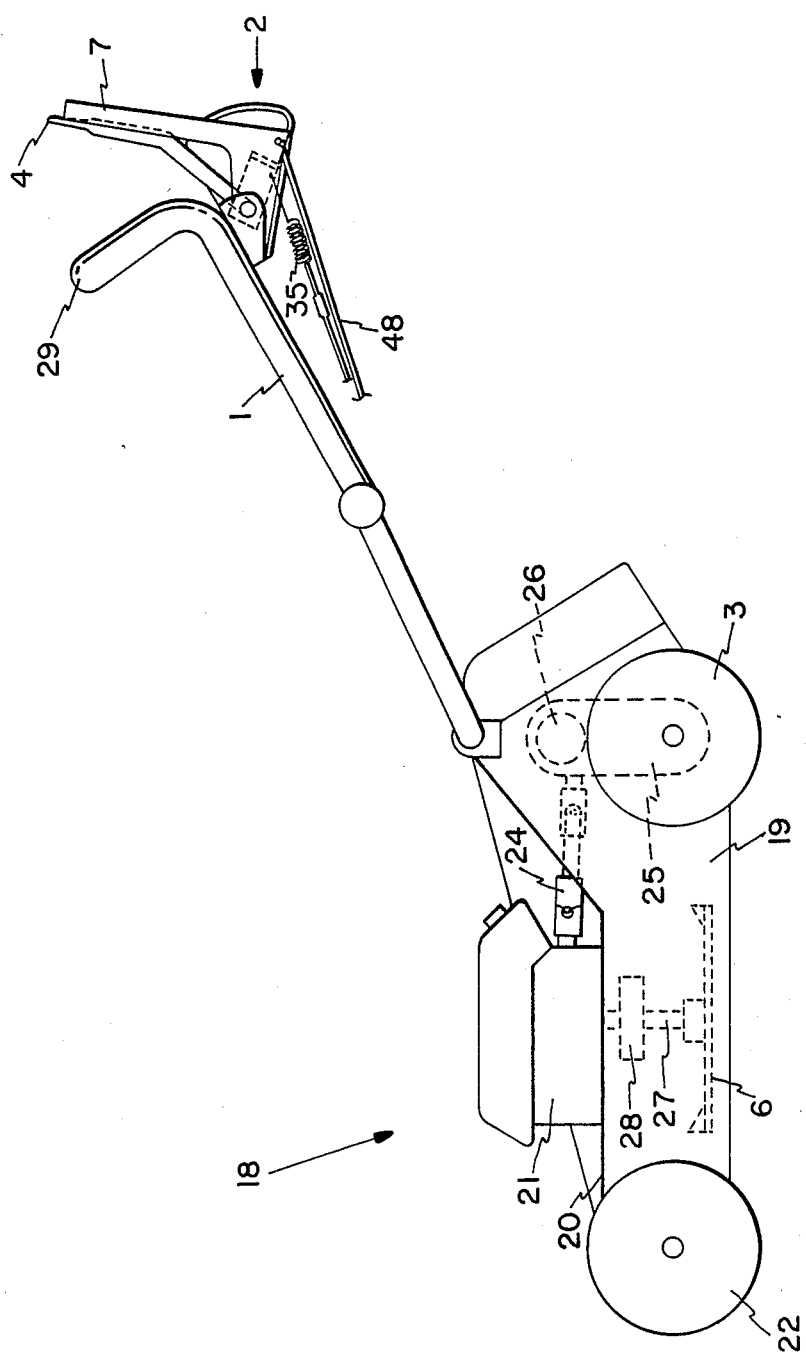
FIG. 5 is an overall side view.

As shown in the rear views of FIGS. 2 and 3 and in the plan view of FIG. 4, a support member 11 projecting rearward and integrally from the shaft portion 5 on the left side of the running operation lever 4 is fitted thereto and rocks vertically at the same rocking angle as the running operation lever 4 moves to the "connection state position" or to the "cut state position". When the inner rise wall portion 9 of the support frame 2 is positioned to the left side of this support member 11, the running operation lever 4 is restricted from moving in the leftward transverse direction.

The left shaft 5 of the running operation lever 4 is fitted into the support holes 33, 34 in the left support frame 2 consisting of the inner rise wall portion 9, the outer rise wall portion 30 and the ceiling plate 31, opening downward and having a substantially U-shaped form as viewed from the rear, in such a manner as to be capable of moving back and forth. A mowing operation lever 7 is fitted to the outer periphery of this shaft 5 with the shaft 5 being the center of rocking in such a manner as to be capable of rocking back and forth.

Reference numeral 36 represents a split pin, which is fitted into and fixed to a hole 37 at the end of the left shaft 5 of the running operation lever 4 and restricts the transverse movement of the running operation lever 4 to the right through a plain washer 38.

As shown in FIG. 4, the mowing operation lever 7 is a lever equipped with lower holes 39, 39 into which the outer peripheral portion of the left shaft 5 of the running operation lever 4 is fitted and which are bored at the lower base end portions of the lever, the upper portion of the lever 7 being capable of swinging back and forth around the lower portion thereof. This mowing operation lever 7 is fitted while its transverse direction is limited by a collar 23 between the inner rise wall 9 of the left support frame 2 and the outer rise wall portion 30.

As shown in FIG. 3, a projection 8 is disposed on the inner side surface near the base end of the mowing operation lever 7 in such a manner as to project towards the inner rise wall 9 of the support frame 2.

The lower end of an engagement member 10 consisting of a resilient member such as a leaf spring is fitted to the lower part of the inner surface of the inner rise wall 9 of the support frame 2 by pins 40, 40.

An example of the engagement member 10 consists of a vertically elongated flat sheet-like fitting plate 12, bent surfaces 13, 13 bent from the front and rear edges at the upper part of the fitting plate 12 towards the outer rise wall 30 of the support frame 2, an inclined notch 14 at the upper part of the bent surface 13 and a right angled portion 15 on the lower side of the bent surface 13 as shown in FIG. 3.

Figure 6:
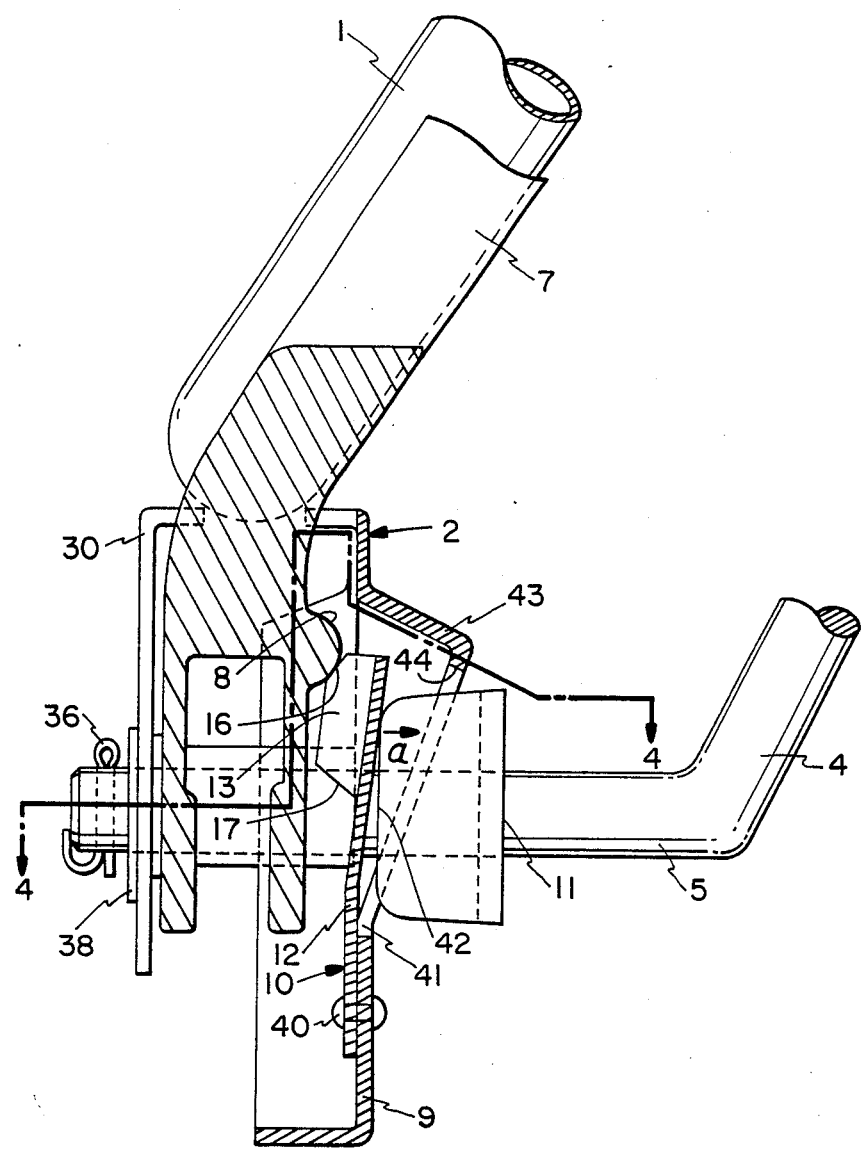
FIG. 6 is another partially sectional rear view of the principal portions.

The second example of the engagement member 10 consists of a vertically elongated flat sheet-like fitting plate 12, bent surfaces 13, 13 bent from the front and rear edges at the upper part of the fitting plate 12 towards the outer rise wall 30 of the support frame 2, a notch 16 at the upper part of the bent surface 13 and an inclined notch 17 on the lower side of the bent surface 13 as shown in FIG. 6.

The inner rise wall of the support frame 2 has a vertically elongated window 41 opened at the side portion of the vertically elongated flat sheet-like fitting plate 12 of the engagement member 10 and the butting surface 42 of a support member 11 which rocks back and forth integrally with the running operation lever 4 is adapted to face this window 41.

The inner rise wall 9 near the window 41 froms an inclined expansion portion 43 whose upper part projects greatly towards the support member 11 and when the support member 11 moves upward beyond a predetermined distance, it butts against the surface of a stopper 44.

In other words, when the running operation lever 4 is in the "connection state position" as the A position in FIG. 1, the butting surface 42 of the support member 11 pushes and moves the fitting plate 12 of the engagement member 10 towards the projection 8 of the mowing operation lever 7 and when it is in the "cut state position" as the B position in FIG. 1, the butting surface 42 of the support member 11 lowers towards the lower end of the fitting plate 12 of the engagement member 10 and the engagement member 10 is moved in the direction (a) represented by arrow towards the inner rise wall 9 by the force of resiliency of the fitting plate 12 so that a gap is defined between the projection 8 of the mowing operation lever 7 and the bent surface 13 of the engagement member 10.

Reference numeral 45 represents a reinforcing bent portion, which projects outward from the rear part of the inner rise wall 9 of the support frame along its lower edge, and the rear half of the ceiling plate 31 of the support frame 2 is open.

The mowing operation lever 7 which rocks or rotates back and forth with the shaft 5 between the inner and outer rise walls 9, 30 being the center of rocking projects upward from the open rear half of the ceiling plate 31 of the support frame 2. It rocks forward until the front surface of the mowing operation lever 7 strikes the grip 29 and rocks rearward until its rear surface strikes the stopper 46 of the reinforcing bent portion 45 of the inner rise wall 9 of the support frame 2.

The range of rocking of this mowing operation lever 7 is substantially the same as the rocking range A-B of the running operation lever 4 and the disconnection—connection direction of the clutch 28 disposed at an intermediate part of the driving shaft 27 of the mowing member 6 is in match with the disconnection—connection direction of the clutch 26 of the running operation lever 4.

Reference numeral 47 represents an interlocking member fitting portion. It pulls the mowing operation lever 7 to the B position of the rocking range, that is, to the clutch (28) disconnection side, by the tensile force of a return spring (not shown in the drawing) disposed at an intermediate part of an interlocking member such as a wire or a rod.

Next, the operation of the embodiment shown in the drawings will be explained.

When both the mowing operation lever 7 and the running operation lever 4 are moved to the lever position A from the clutch (28, 26) disconnection position as from the lever position B by rocking forward the mowing operation lever 7, the clutch 28 on the side of the mowing member 6 is connected and the mowing member 6 starts rotating.

While the mowing operation lever 7 is being kept in this position A by one of the operator's hands, the running operation lever 4 is together moved forth towards the connection side of the clutch 26 as the lever position A by the other hand.

Thereafter, when one of the hands is released, the projection 8 of the mowing operation lever 7 is hooked up with the bent surfaces 13, 13 of the engagement member 10. It is therefore only necessary to grip the running operation lever 4 and the grip 29 so that the other operational portions can be operated by the other operator's hand.

If the other hand is released from the running operation lever 4 during mowing work with both the clutches 28 and 26 connected, the running operation lever 4 moves automatically to the clutch 26 disconnection position B to retract the engagement member 10 in the direction of an arrow (B) due to the pull force of the return spring 35. Accordingly, the mowing operation lever 7 also moves then automatically to the clutch 28 disconnection position B.

Even if the operator erroneously operates in a flurry only the mowing operation lever 7 in the disconnecting direction in an emergency or the like, the mowing operation lever 7 moves down while the projection 8 moves along the inclined notch 16 at the upper part of the bent surface 13 of the engagement member 10 and the bent surface 13 or the fitting plate 12 is resiliently deformed, and consequently the mowing operation lever 7 does not get broken and the clutch 28 can be disconnected.

Generally, when the operation is started in a stop state, the clutch 28 of the mowing operation lever 7 is first connected. However, when the mowing operation lever 7 is connected after the running operation lever 4 due to the erroneous operation, the projection 8 of the mowing operation lever 7 comes into contact with the inclined notch 17 at the lower part of the bent surface 13 in the second embodiment of the engagement member 10 shown in FIG. 6 and provides resistance to it. Accordingly, the operator can notice that his operation is the wrong operation.

Furthermore, if the operator continues operation irrespective of this warning, the clutch 28 can be connected without the breakage of the mowing operation lever 7 because the projection 8 of the mowing operation lever 7 moves upward while causing elastic deformation of the bent surface 13 or the fitting plate 12 along the inclined notch 17 at the lower part of the bent surface 13 of the engagement member 10.

What is claimed is:

1. An operation device of a walker operated mower comprising:
    a handle grip (29),
    support frames (2, 2) disposed on opposite sides of said handle grip (29),
    a running operation lever (4) having opposed shaft ends (5, 5) rotatably mounted between said support frames (2, 2), whereby said running operation lever is rotatably mounted between an operative and inoperative position,
    a mowing operation lever (7) rotatably journeled on said shaft end (5, 5) for independent rotation relative to said running operation lever (4) between an operative and inoperative position,
    means for interlocking said running operation lever (4) and said mowing operation lever in the operative position thereof,
    said interlocking means including a projection (8) extending lateral of said mower operation lever (7) at one end thereof, and
    a resilient engagement member (10) such as a leaf spring connected to said support frame (2) adjacent said projection (8),
    a support member (11) connected to said running operation lever (4) for camming said engagement member (10) toward and away from said projection (8) as said running operation lever (4) is rotated between operative and inoperative position, whereby in the operative position of said running operational lever (4) and said mower operational lever (7), said support member (11) cams said engagement member (10) toward said projection (8) to anchor said projection and maintain said mowing operation lever (7) in the operative position thereof; and in the inoperative position of said running operation lever (4), said support member (11) disengages from said projection (8) to free the rotation of said mowing operation lever (7) relative to said running operation lever (4).

2. An operational device for a power walker operated mower including a cover mounted on wheels, a rotary cutting blade, and a power means including independently actuated clutch means for independently engaging said cutting blade and said wheels in driving relationship to said power means, the improvement of a handle means having a handle grip, support frames disposed at opposite sides of said handle grip, a running operation lever having opposed shaft ends rotatably mounted between said support frames between an operative driving and inoperative non-driving position, a mowing operation lever rotatably mounted on said shaft ends for rotation relative to said running operation lever between an operative mowing and inoperative non-mowing position, and anchoring means for interlocking said running operation lever and said mowing operation lever in their respective operative driving and mowing position whereby said lever can be maintained in the respective operative positions thereof by one hand.

3. An operation device as defined in claim 2, wherein said anchoring means comprises a resilient engaging member connected to said support frame, projecting means on said mowing operation lever to be engaged by said engaging member, and means on said running operation lever for biasing said engaging member toward said projecting means as said running operation lever is rotated in the operative position thereof.

4. An operation device as defined in claim 3, wherein said resilient engaging member includes opposed bent surfaces, said bent surfaces having an inclined notch at the upper portion of the respective bent surfaces.

5. An operation device as defined in claim 4, wherein said bent surfaces includes an inclined notch at the lower portion of said bent surfaces.

* * * * *